US007134047B2

(12) United States Patent
Quach (10) Patent No.: US 7,134,047 B2
(45) Date of Patent: *Nov. 7, 2006

(54) FIRMWAVE MECHANISM FOR CORRECTING SOFT ERRORS (75) Inventor: Nhon Quach, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/622,910

(22) Filed: Jul. 18, 2003

(65) Prior Publication Data

US 2004/0019771 A1 Jan. 29, 2004

Related U.S. Application Data (63) Continuation of application No. 09/469,963, filed on Dec. 21, 1999, now Pat. No. 6,625,749.

(51) Int. Cl.
*G06F 11/00* (2006.01)
*G06F 15/00* (2006.01)

(52) U.S. Cl. .............................. 714/11; 712/229; 712/43

(58) Field of Classification Search .................. 714/10, 714/12, 11; 712/220, 229, 20, 43; 700/3, 700/4, 5
See application file for complete search history.

(56) References Cited

U.S. PATENT DOCUMENTS

| 4,453,215 A | 6/1984 | Reid |
| 4,553,215 A | 11/1985 | Masuda et al. |
| 4,912,707 A | 3/1990 | Kogge et al. |
| 5,475,856 A | 12/1995 | Kogge |
| 5,504,859 A | 4/1996 | Gustafson et al. |
| 5,530,802 A | 6/1996 | Fuchs et al. |
| 5,664,214 A | 9/1997 | Taylor et al. |
| 5,748,873 A | 5/1998 | Ohguro et al. |
| 6,279,119 B1 | 8/2001 | Bissett et al. |
| 6,393,582 B1 | 5/2002 | Klecka et al. |
| 2003/0167389 A1* | 9/2003 | Soltis et al. ................. 712/220 |

(Continued)

FOREIGN PATENT DOCUMENTS

EP          0315303          5/1989

(Continued)

OTHER PUBLICATIONS

Keith Diefendorff, Microprocessor Report, Nov. 15, 1999, pp. 8, vol. 13, No. 15.

(Continued)

*Primary Examiner*—Robert Beausoliel
*Assistant Examiner*—Christopher McCarthy
(74) *Attorney, Agent, or Firm*—Blakely, Sokoloff, Taylor & Zafman LLP (57) ABSTRACT A computer system includes processor having dual execution cores and a non-volatile memory that stores an error recovery routine. The processor's execution cores operate in lock step when the processor is in a redundant execution mode, and they operate independently when the processor is in a split execution mode. The error recovery routine is invoked when the processor detects a soft error while operating in the redundant execution mode. The error recovery routine switches the processor to split execution mode. In split mode, each execution core saves uncorrupted processor state data to a designated memory location and updates any corrupted data with corresponding processor state data from the other execution core. The error recovery routine returns the processor to redundant mode, initializes each execution core with the recovered processor state data, and returns control of the processor to the program thread that was executing when the soft error was detected.

13 Claims, 9 Drawing Sheets

U.S. PATENT DOCUMENTS

| | | | |
|---|---|---|---|
| 2004/0006722 A1* | 1/2004 | Safford | 714/11 |
| 2004/0078650 A1* | 4/2004 | Safford et al. | 714/11 |
| 2004/0078651 A1* | 4/2004 | Safford et al. | 714/11 |
| 2005/0149776 A1* | 7/2005 | Hinrichs | 714/10 |
| 2005/0240810 A1* | 10/2005 | Safford et al. | 714/10 |
| 2005/0240811 A1* | 10/2005 | Safford et al. | 714/11 |

FOREIGN PATENT DOCUMENTS

| | | |
|---|---|---|
| EP | 0411805 A2 | 2/1991 |
| WO | WO 99/66407 | 12/1999 |

OTHER PUBLICATIONS

Keith Diefendorff, Power4 Focuses on Memory Bandwidth, Oct. 6, 1999, pp. 11-17.

* cited by examiner

FIRMWAVE MECHANISM FOR CORRECTING SOFT ERRORS

BACKGROUND

This Application is a Continuation of the prior application for "FIRMWARE MECHANISM FOR CORRECTING SOFT ERRORS" filed by Nhon Quach on Dec. 21, 1999 now U.S. Pat. No. 6,625,749 (U.S. patent application Ser. No. 09/469,963).

1. Technical Field

The present invention relates to microprocessors and, in particular, to microprocessors capable of operating in high-reliability modes.

2. Background

Soft errors arise when alpha particles or cosmic rays strike an integrated circuit and alter the charges stored on the voltage nodes of the circuit. If the charge alteration is sufficiently large, a voltage representing one logic state may be changed to a voltage representing a different logic state. For example, a voltage representing a logic true state may be altered to a voltage representing a logic false state, and any data that incorporates the logic state will be corrupted.

Soft error rates (SERs) for integrated circuits, such as microprocessors ("processors"), increase as semiconductor process technologies scale to smaller dimensions and lower operating voltages. Smaller process dimensions allow greater device densities to be achieved on the processor die. This increases the likelihood that an alpha particle or cosmic ray will strike one of the processor's voltage nodes. Lower operating voltages mean that smaller charge disruptions are sufficient to alter the logic state represented by the node voltages. Both trends point to higher SERs in the future. Soft errors may be corrected in a processor if they are detected before any corrupted results are used to update the processor's architectural state.

Processors frequently employ parity-based mechanisms to detect data corruption due to soft errors. A parity bit is associated with each block of data when it is stored. The bit is set to one or zero according to whether there is an odd or even number of ones in the data block. When the data block is read out of its storage location, the number of ones in the block is compared with the parity bit. A discrepancy between the values indicates that the data block has been corrupted. Agreement between the values indicates that either no corruption has occurred or two (or four . . . ) bits have been altered. Since the latter events have very low probabilities of occurrence, parity provides a reliable indication of whether data has been corrupted. Error correcting codes (ECCs) are parity-based mechanisms that track additional information for each data block. The additional information allows the corrupted bit(s) to be identified and corrected.

Parity/ECC mechanisms have been applied extensively to caches, memories, and similar data storage arrays. These structures have relatively high densities of data storing nodes and are susceptible to soft errors even at current device dimensions. Their localized array structures make it relatively easy to implement parity/ECC mechanisms. The remaining circuitry on a processor includes data paths, control logic, execution logic and registers ("execution core"). The varied structures of these circuits and their distribution over the processor die make it more difficult to apply parity/ECC mechanisms.

One approach to detecting soft errors in an execution core is to process instructions on duplicate execution cores and compare results determined by each on an instruction by instruction basis ("redundant execution"). For example, one computer system includes two separate processors that may be booted to run in either a symmetric multi-processing ("SMP") mode or a Functional Redundant Check ("FRC") mode. In SMP mode, instruction execution is distributed between the processors to provide higher overall performance than single processor systems. In FRC mode, one processor executes code normally and a second processor executes identical instructions on the same data that is provided to the first processor. If the second processor detects a discrepancy between its operations and those of the first processor, it signals an error. The operating mode can only be switched between SMP and FRC modes by resetting the computer system.

The dual processor approach is costly (in terms of silicon). In addition, the inter-processor signaling through which results are compared is too slow to detect corrupted data before it updates the processors' architectural states. Consequently, this approach is not suitable for correcting the detected soft errors.

Another computer system provides execution redundancy using dual execution cores on a single processor chip. The two execution cores operate in FRC mode, and ECC protected check point registers store information on intermediate states of the processor. When an error is detected in a code segment, the processor implements a micro-code routine to restore the processor to the last uncorrupted processor state, using the check point registers. Control is then returned to the code segment, beginning with the instruction (s) that encountered the error. The error recovery micro-code routine is stored on the processor chip, making it difficult to update or modify. In addition, routines sufficiently flexible to correct a broad range of errors tend to be relatively complex. Micro-code implementations of these routines occupy significant area on the processor die.

The present invention addresses these and other deficiencies of available high reliability computer systems.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a flexible approach to correcting soft errors in a dual core processor which may be switched dynamically between a redundant mode and a split mode. In redundant mode, the processor operates the execution cores in lock step on identical code segments and compares the results to identify errors. In split mode, the execution cores may process instructions independently, e.g. the execution cores may operate on different instructions in a given clock cycle.

For one embodiment of the invention, the redundant mode may be a high reliability (HR) processor execution mode that reduces the risk of soft errors when executing critical code segments. The split mode may be a high performance (HP) processor execution mode that is available to process selected code faster, by increasing the execution resources available to the selected code. The split mode may also be available for only selected purposes, such as error recovery or bootstrapping the processor. The significant aspect of split mode is that it allows the execution cores to operate "independently", i.e. each may execute different instructions on a given clock cycle.

In accordance with the present invention, an error recovery routine is stored in a non-volatile memory. The recovery routine is accessed when the processor, implementing a program thread in redundant mode, detects a soft error. The error may be indicated by a discrepancy between results in the two execution cores. The routine switches the processor to split mode, in which mode each execution core examines its associated storage locations for corrupted data. Uncorrupted data is copied to a designated memory location and sufficient processor state data is recovered from the uncorrupted data to resume the interrupted program thread. The recovery routine initializes the execution cores with the recovered processor state data.

For one embodiment of the invention, various resources associated with each execution core are parity-protected, and the recovery routine implements a parity check to identify any corrupted data in an execution core. Parity-protected resources may include, for example, general registers, floating point registers, control and status registers, low level caches, and the like. In general, any structure used to store processor state data can be parity-protected. The extent of protection depends on the system's reliability requirements.

For another embodiment of the invention, the error recovery routine identifies and saves uncorrupted data from one or both execution cores to a designated memory location. The execution cores are initialized with processor state data recovered from the saved data. For example, both execution cores may be initialized with the processor state data saved from the execution core that did not experience the soft error. Alternatively, uncorrupted data from each execution core may be saved to different memory locations, and data from one memory location may be used to replace the corrupted data in the other memory location. This alternate approach initializes each execution core with a copy of the processor state data from its designated memory location. By maintaining separate sets of processor state data, this alternative reduces the risk that a soft error generated during the initialization process will escape detection. The recovery routine synchronizes the execution cores for a return to redundant mode following the identification and reconciliation of saved processor state data from the execution cores in split mode.

For another embodiment of the invention, the processor may be configured to retain some level of redundancy within the individual execution cores in split mode. For example, the execution resources of each execution core may be logically organized into redundant execution clusters for split mode operations. The execution clusters operate in lock step on the same instruction when the processor is in split mode, and results from the redundant clusters may be compared to detect soft errors within a single execution core.

Figure 1:
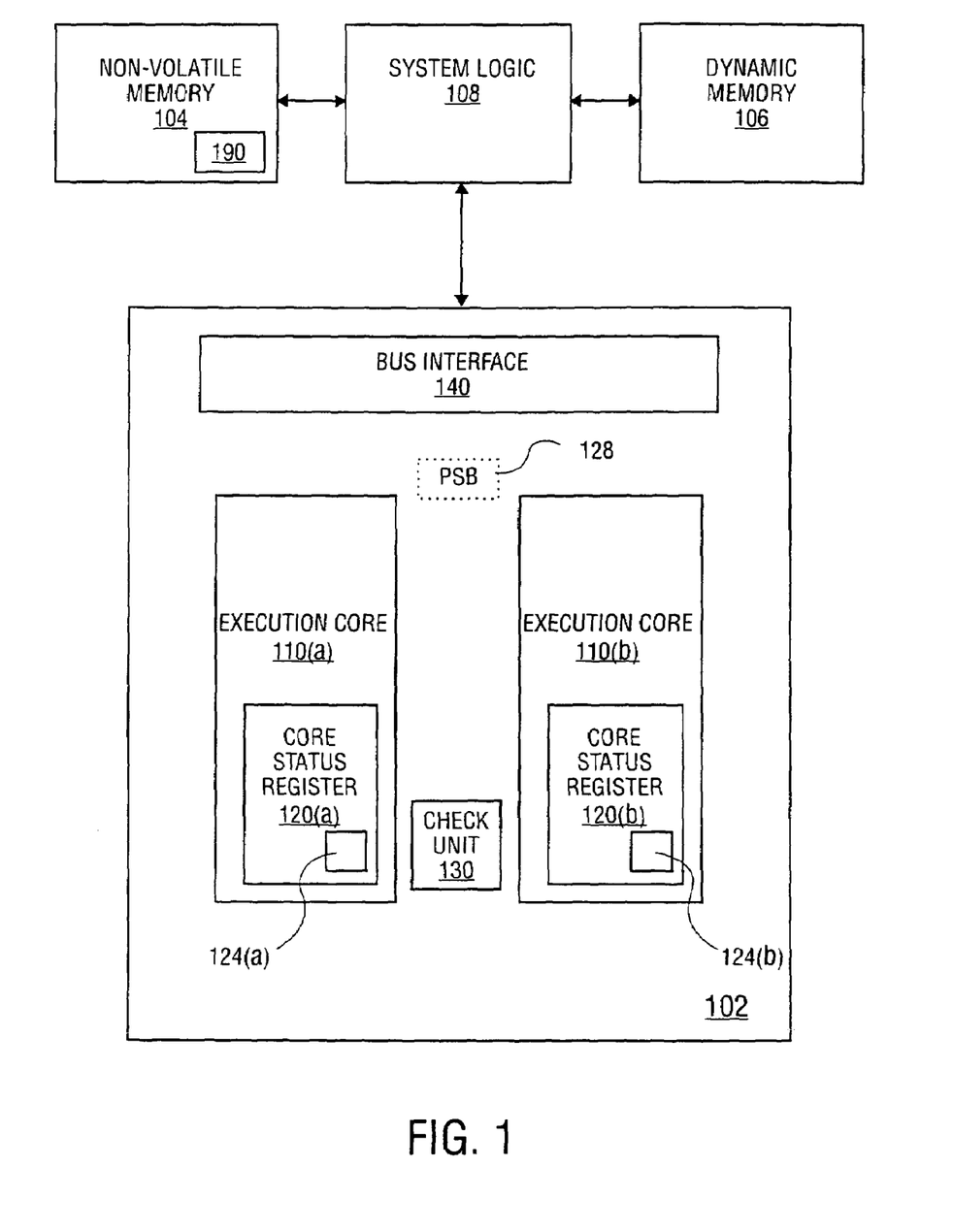
FIG. 1 is a block diagram of one embodiment of a computer system suitable for implementing the present invention.

FIG. 1 is a block level diagram of one embodiment of a computer system 100 in accordance with the present invention. Computer system 100 comprises a processor 102, a nonvolatile memory 104, a dynamic memory 106, and system logic 108. System logic 108 routes communications among processor 102, non-volatile memory 104, and dynamic memory 106. An error recovery routine 190 is stored in non-volatile memory 104, although portions of routine 190 may be copied (shadowed) to dynamic memory 106.

The disclosed embodiment of processor 102 includes a first execution core 110(*a*), a second execution core 110(*b*), corresponding core status registers (CSRs) 120(*a*), 120(*b*), and a check unit 130. Each CSR 120(*a*), 120(*b*) includes a core status bit (CSB) 124(*a*), 124(*b*), respectively. A bus interface 140 to transfer data/instructions to and from processor 102 is also shown. Each execution core 110(*a*), 110(*b*) includes resources to fetch, decode, execute, and retire instructions. In the following discussion, references to execution cores 110(*a*), 110(*b*) are not indexed unless the comments apply to a specific execution core 110. References to CSRs 120, CSBs 124, and any other resources that may be duplicated in execution cores 110 are treated similarly.

In redundant mode, execution cores 110 execute the same instructions from a code segment in lock step, and the results are compared by check unit 130 to detect errors in either execution core 110. In split mode, execution cores 110 operate "independently". That is, each may execute different instructions from one or more code segments. As noted above, split mode may provide a programmable high performance mode for selected programs since the execution resources available in the processor are effectively doubled in split mode.

The level of independence between execution cores 110 in split mode may vary in different embodiments of processor 102. For one embodiment, processor 102 may operate as an SMP system implemented on a single processor chip, when it is in split mode. In this case, each execution core 110 operates as a separate processor, sharing only the processor die and certain components of a memory system. This embodiment of processor 102 is particularly useful for code that requires a high performance processor. Another embodiment of processor 102 may support some level of coupling between execution cores 110 in split mode by providing appropriate channels to share processor state information or execution core resources.

Switching between redundant and split modes may be accomplished under hardware, software or firmware control. For software and firmware controlled switching, mode switch instructions may be provided through the different program threads being executed, an operating system (OS) scheduler, interrupt handlers, firmware routine or similar sources. For hardware controlled transitions, switching may be triggered in response to detected conditions, e.g. execution of a particular instruction type, detection of a discrepancy between results in different execution cores or resolution of the discrepancy.

For one embodiment of the invention, CSBs 124(a) and 124(b) indicate the states of execution cores 110(a) and 110(b), respectively, and CSBs 124(a) and 124(b) together indicate the mode in which processor 102 is operating. The execution mode of the processor as a whole may be tracked through a single processor status bit (PSB) 128, indicated by the dashed box in FIG. 1. For one embodiment, CSB 124 is set to a first value, e.g. one, when processor 102 is to be operated in redundant mode, and it is set to a second value, e.g. zero, when processor 102 is to be operated in split mode. CSB 124 may be adjusted when a mode switch instruction triggers a switch between redundant and split modes. Various resources in processor 102 alter their operations according to its execution mode. For the disclosed embodiment of processor 102, instruction fetching, instruction retirement, and result checking are handled differently in redundant and split modes, and the corresponding resources adjust their operations according to the states of CSBs 124 (or PSB 128).

An embodiment of processor 102 having dual execution modes is disclosed in U.S. patent application Ser. No. 09/470,098, entitled "Microprocessor With High Reliability Operating Mode" and filed on even date herewith.

Figure 2A:
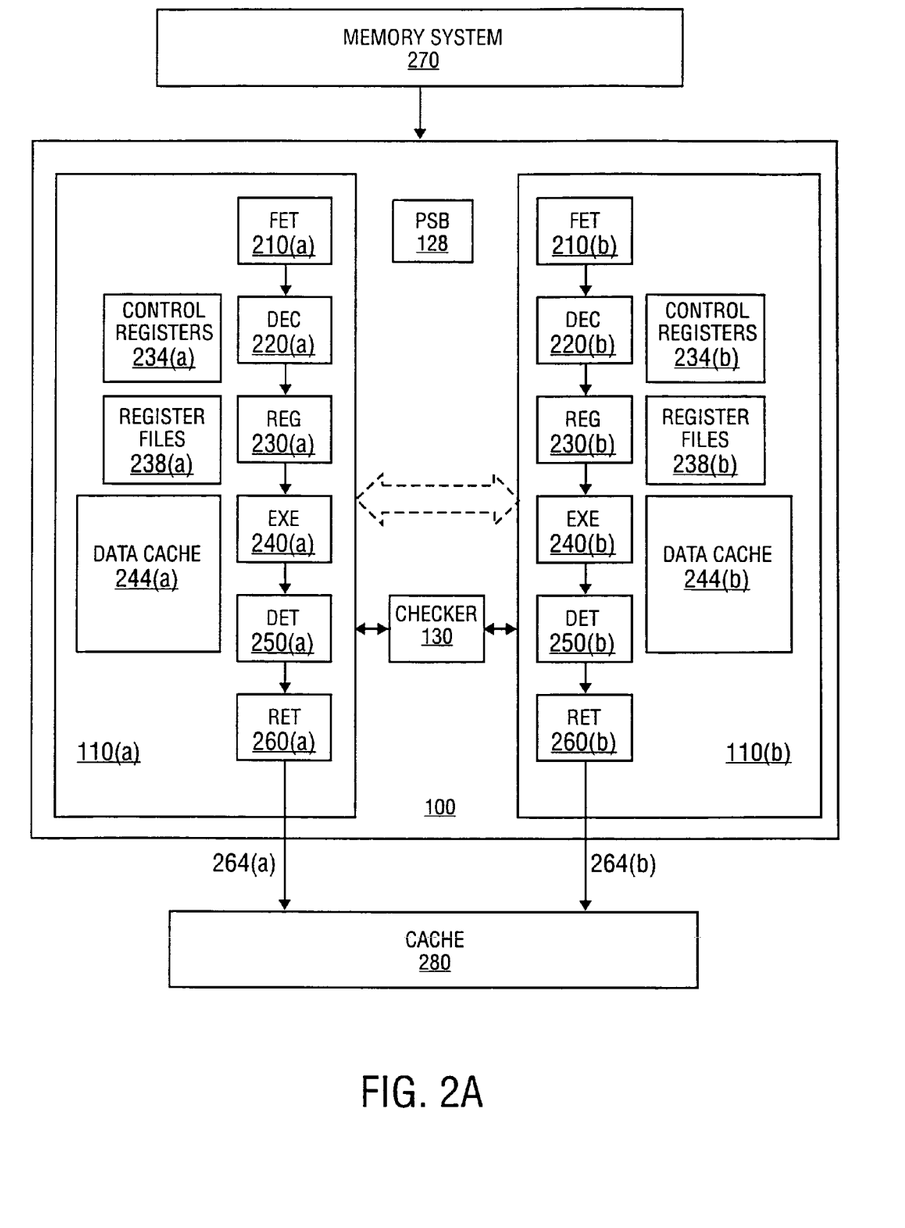
FIG. 2A is a block diagram of one embodiment of the dual execution core processor in FIG. 1.

FIG. 2A represents in greater detail one embodiment of processor 102. For the disclosed embodiment, each execution core 110 is represented as a series of stages in an instruction execution pipeline. Each stage corresponds to one or more operations implemented by execution cores 110 to execute their instructions. Alternatively, the pipeline stages may be understood to represent the logic that executes the indicated operations. Instructions and data are provided to execution cores 110 from a memory system 270. Memory system 270 represents dynamic memory 106 and any intervening caches. For example, cache 280 represents one portion of memory system 270 to which results from executed instructions are written. Cache 280 may be located on the same chip as processor 102 or it may be located on a separate chip.

For the disclosed embodiment of processor 102, each execution core 110 is partitioned into a fetch (FET) stage 210, a decode (DEC) stage 220, a register (REG) stage 230, an execute (EXE) stage 240, a detect (DET) stage 250, and a retirement (RET) stage 260. One or more instructions are retrieved from memory system 270 in FET stage 210. The retrieved instructions are decoded into µops in DEC stage 220, and source operands specified by the µop(s) are retrieved in REG stage 230. The µop(s) are executed on the retrieved operands in EXE stage 240, and any exceptions raised by the µop(s) are signaled in DET stage 250. The µop(s) is retired in RET stage 260 if no exceptions are detected. For the disclosed embodiment, results from retired µop(s) are written to cache 280 through retirement channel 264.

In this discussion, instruction, instruction bundle, and macro-instruction are used interchangeably as are µop and instruction syllable. The latter refer to the instruction recognized by the execution units of the processor. The former refer to instructions in the form in which they are provided to the processor. For some embodiments, there may be little or no difference between these entities.

Embodiments of processor 102 may include a buffer to decouple front-end stage(s) (FET or FET and DEC) from back-end stages (DEC, REG, EXE, DET, and RET or REG, EXE, DET, and RET). The buffer temporarily stores fetched (or fetched and decoded) instructions. This allows front-end operations to continue, even if back-end operations are stalled or otherwise delayed. It also allows back-end operations to proceed if front-end operations are delayed. One embodiment of processor 102 employs a decoupling buffer to correct errors detected in redundant mode.

The present invention does not require partition of processor 102 into a particular set of pipeline stages. For example, a disclosed stage may be subdivided into two or more stages to address timing issues or facilitate higher processor clock speeds. Alternatively, two or more stages may be combined into a single stage. Other embodiments may or may not employ a decoupling buffer. Still other embodiments may include hardware for processing instructions out-of-order. The disclosed pipeline provides only one example of how operations may be partitioned in a processor for use with the present invention.

Also shown for each execution core 110 are status/control (S/C) registers 234, data registers 238, and a data cache 244. S/C registers 234 store information that governs the operation of execution core 110. For example, S/C registers 234 typically include CSR 120 (and CSB 124). Data registers 238 store operands for use by various resources in execution core 110, and data cache 244 buffers operands between memory system 270 and other resources in execution core 110. Depending on timing constraints, data cache 244 may provide operands to data registers 238, to execution resources in EXE stage 240, or to both. For one embodiment of the invention, each execution core 110 provides some form of parity protection for S/C registers 234, data registers 238, and cache 244.

Execution cores 110(a) and 110(b) are synchronized to operate on identical instructions in lock step when processor 102 is in redundant mode. In split mode, execution cores 110(a) and 110(b) may operate independently on different instructions. As noted above, various embodiments of processor 102 may support different levels of coordination between execution cores 110(a) and 110(b) in split mode, as indicated by the dashed arrow in FIG. 2A. For example, if processor 102 operates as a single chip SMP system in split mode, the need for coordination between execution cores 110(a) and 110(b) arises mainly during mode switches. For other embodiments of processor 102, execution cores 110(a) and 110(b) may handle processes that are closely coupled. These embodiments support some sharing of data between S/C registers 234(a) and 234(b), data registers 238(a) and 238(b), and data caches 244(a) and 244(b), as well as some coordination of operations between the different pipe stages.

Figure 2B:
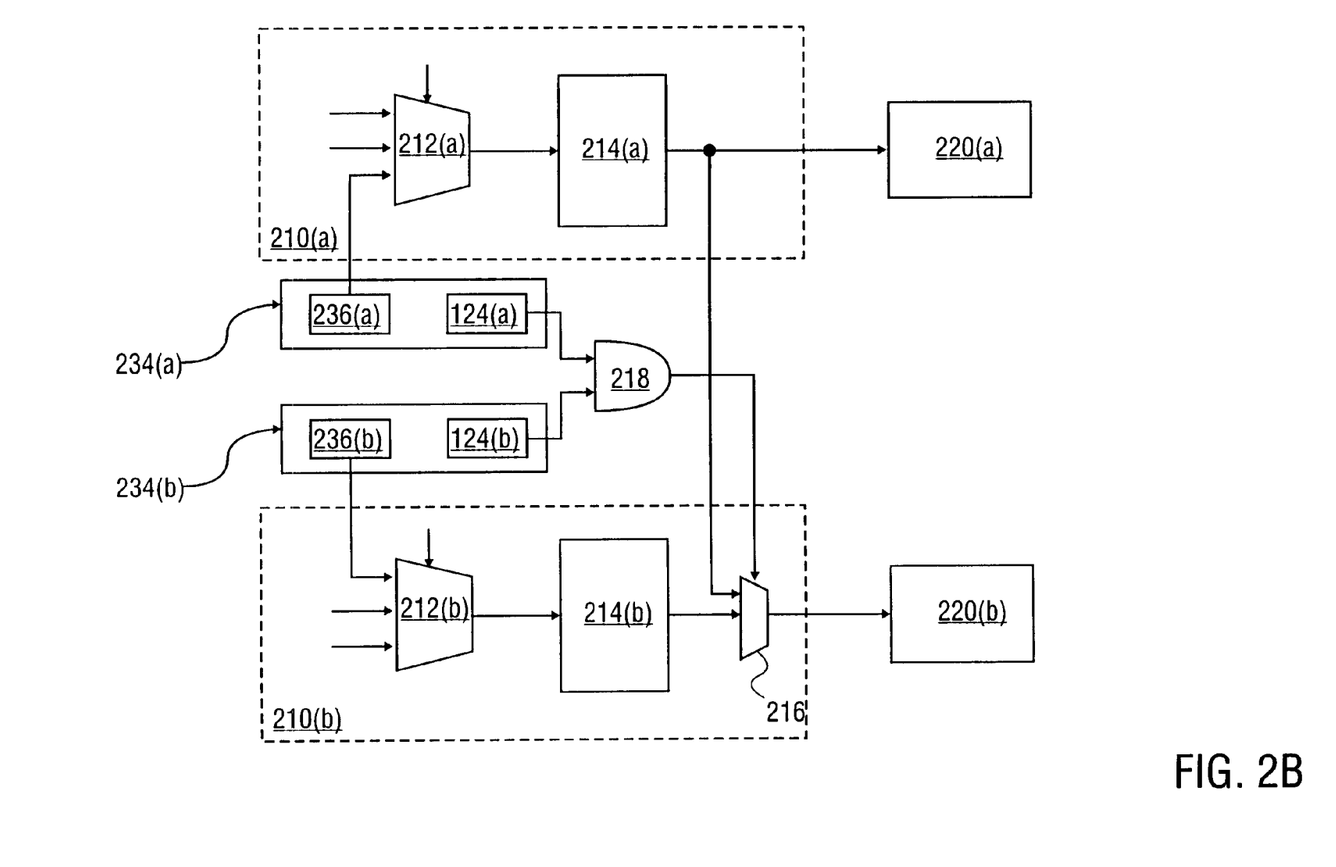
FIG. 2B is a block diagram of one embodiment of the FET stage of the processor in FIG. 2A.

FIG. 2B shows one embodiment of FET stages 210(a), 210(b) suitable for providing instructions to execution cores 110(a), 110(b), respectively, in redundant mode and split mode. Each FET stage 210 includes an instruction pointer (IP)-select MUX 212 and an instruction cache 214 that is coupled to DEC stage 220. S/C registers 234 include an IP register 236 that may be initialized by software to indicate the next instruction to be executed. In addition, FET stage 210(b) includes a MUX 216 at the output of cache 214(b). MUX 216 is controlled by CSBs 124 through AND gate 218. For one embodiment of the invention, instruction cache 214 may be protected by a parity-based scheme such as ECC.

MUX 212 receives IPs at its data inputs from various sources, including IP register 236. In response to a signal at its control input, MUX 212 selects one IP to indicate the next instruction to be fetched from cache 214. In split mode, CSBs 124 are set to zero and MUX 216 transfers the instruction provided by instruction cache 214(b). In this mode, IP registers 236(a) and 236(b) are initialized and updated independently, and caches 214(a) and 214(b) feed corresponding instructions to DEC stages 220(a) and 220(b), respectively. In redundant mode, CSBs 124 are set to one, and MUX 216 provides the instruction from cache 214(a) to DEC stage 220(b).

An alternative embodiment of FET stages 210 does not employ MUX 216. Instead, IP registers 236(a), 236(b) and caches 214(a), 214(b) are initialized to the same state for redundant mode, and FET stages 210, including caches 214, operate in lock step. Persons skilled in the art of processor design and having the benefit of this disclosure will recognize other variations on FET stages 210 that may be used to implement independent and lock-step instruction fetching for execution cores 110, according to the execution mode in which processor 102 operates.

Figure 2C:
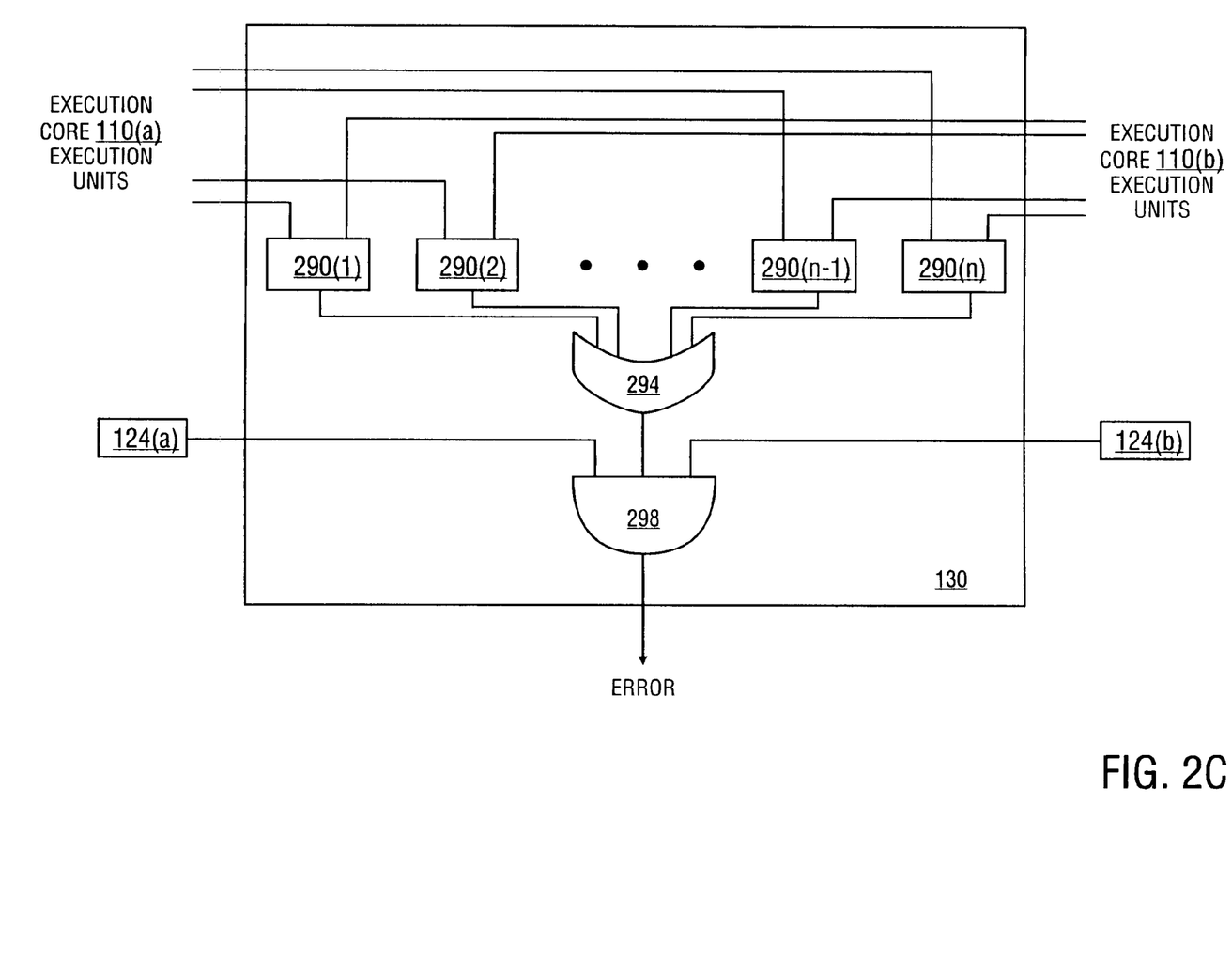
FIG. 2C is a block diagram of one embodiment of the check unit of the processor in FIG. 2A.

FIG. 2C is a block diagram representing one embodiment of check unit 130 in accordance with the present invention. The disclosed embodiment of check unit 130 includes "n" comparators 290(1)–290(n), an OR gate 294, and an AND gate 298. A comparator 290 is provided for each execution unit in an execution core 110. For example, one embodiment of processor 102 may include an integer execution unit (IEU), a floating-point execution unit (FPU), a memory execution unit (MEU), and a branch execution unit BRU in the EXE stage of each execution core 110. For this embodiment, check unit 130 includes 4 comparators 290. Comparator 290(1), 290(2), 290(3) and 290(4) monitor outputs of the IEUs, FPUs, MEUs, and BRUs, respectively, from execution cores 110(a) and 110(b).

For the disclosed embodiment of check unit 130, each comparator 290 generates a logic value zero when the execution results applied to its inputs match and a logic value one when the execution results do not match. For one embodiment of check unit 130, comparators 290 are self-check comparators. OR gate 294 generates a logic value one when any of comaparators 290 indicates that its corresponding execution results do not match. The output of OR gate 294 serves as an ERROR signal when AND gate 298 is enabled. For the disclosed embodiment, this occurs when CSBs 124 are both set to one, i.e. when processor 102 is in redundant mode.

Persons skilled in the art of processor design and having the benefit of this disclosure will recognize other variations on check unit 130 that may be activated to monitor results in execution cores 110 when processor 102 is in redundant mode.

The present invention provides a firmware-based recovery mechanism that may be implemented alone or in combination with hardware and software-based recovery mechanisms, to restore the processor to an error-free state when a discrepancy is detected in redundant mode. The soft errors targeted by the present invention are unlikely to occur in both execution cores 110 simultaneously. A difference between execution results detected by check unit 130 is likely due to a soft error in the circuitry of one of execution cores 110. Storage structures such as register files, caches, latches and the like are particularly susceptible to these errors. These structures store voltage levels that represent operand values, instructions, or μops at various points of the instruction pipeline. The present invention provides a mechanism to restore integrity to the execution cores of a processor operating in redundant mode, when a discrepancy is detected between results generated by the execution cores.

According to one embodiment of the present invention, a firmware-based recovery routine is accessed when a discrepancy is detected between the results generated by the two execution cores of the processor in redundant mode. The error recovery routine switches the processor to split mode, in which mode each execution core examines data from its execution resources for errors and saves the uncorrupted data to a specified memory location. The error recovery routine initializes the execution cores, using the uncorrupted data, and returns control to the interrupted program thread. For one embodiment of the invention, the execution resources examined are parity-protected storage structures. Sufficient processor state data is recovered from the uncorrupted data to initialize both execution cores for continued processing of the interrupted program thread.

The use of a firmware-based recovery routine allows the processor to implement more sophisticated recovery mechanisms. These mechanisms can address a wider variety of errors than can be addressed through micro-code or hardware-based recovery mechanisms, both of which are limited by their impact on die area. Firmware-based recovery mechanisms can be updated more easily to handle different errors or implement improvements in error recovery algorithms. In addition, firmware-based recovery mechanisms can notify higher level systems, such as system level firmware or the operating system, to take appropriate action if necessary.

For one embodiment of the invention, the error recovery routine may be accessed through a machine check (MC). The MC may be triggered by check unit 130, when a discrepancy is detected. Alternatively, the processor may first attempt to address the discrepancy through a hardware recovery mechanism and trigger the error recovery routine only if the hardware mechanism fails. Hardware recovery mechanisms include, for example, resteering the execution core(s) or portions of the execution core(s) to re-execute the instruction stream beginning with the instruction for which the discrepancy was detected.

Figure 3:
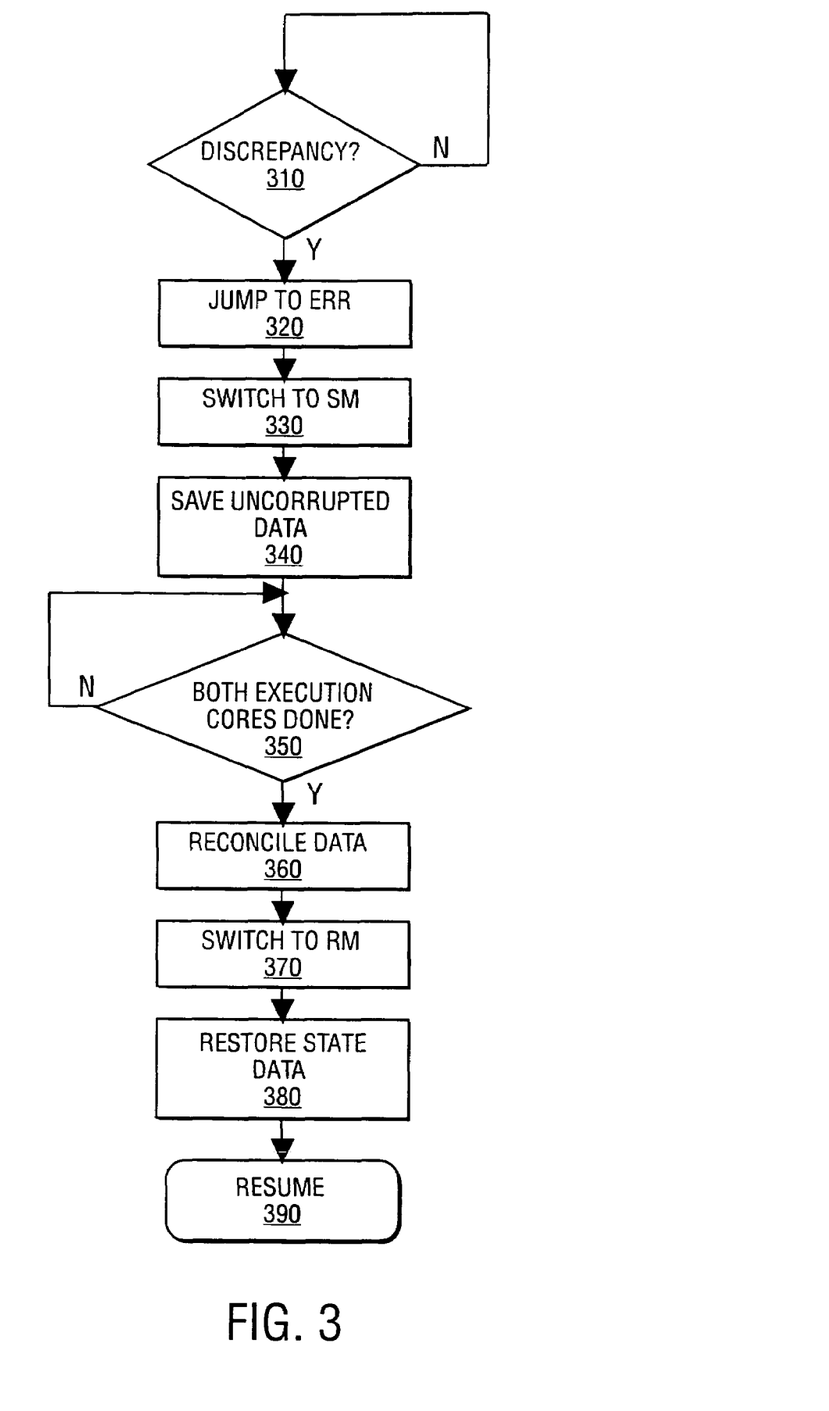
FIG. 3 is a flow chart representing one embodiment of a method in accordance with the present invention for recovering from soft errors.

FIG. 3 is a flow chart representing a method 300 in accordance with the present invention for correcting soft errors. Method 300 is initiated when an error is detected 310 while the processor is operating in redundant mode. The error may be indicated by a discrepancy between results generated by the first and second execution cores. When the error is detected 310, the processor jumps 320 to an error recovery routine (ERR). This may be done, for example, by triggering an MC, and directing the processor to the ERR through an associated vector table.

The ERR switches 330 the processor from redundant mode (RM) to split mode (SM). For one embodiment of method 300, each execution core operates in split mode to save 340 uncorrupted data from its parity-protected storage structures to a specified memory location. Uncorrupted data may be identified by scanning the data in parity-protected resources for parity errors or by copying the data from these resources to a memory location and scanning the copied data for parity errors. When both execution cores complete 350 their data saves, the saved data is reconciled 360 to provide an uncorrupted set of processor state data. For another embodiment of method 300, only the execution core that identifies no corrupted data in its storage structures saves 340 its data to the specified memory location. The processor is returned 370 to redundant mode, the execution cores are initialized 380 using the recovered processor state data, and execution of the interrupted process thread resumes 380.

For one embodiment of the invention, processor 102 is switched between redundant and split modes under software control, e.g. through mode switch instruction. For another embodiment of the invention, the processor 102 may be switched through a hardware mechanism.

Prior to detecting a discrepancy, the processor is in redundant mode and the execution cores operate in lock step. When a discrepancy is detected, the error recovery routine may implement the mode switch by providing a switch-to-split-mode instruction (SW_SM) to each execution core. In redundant mode, these instructions are staged down the pipeline stages of the two execution cores in lock step, switching the processor to split mode when they retire. There is thus no need to synchronize the execution cores on the switch to split mode. Once the processor is in split mode, each execution core may independently execute the data recovery operations of ERR.

When the execution core(s) complete its data recovery operations, the processor transitions from split mode back to redundant mode to continue the interrupted program thread. For one embodiment of the invention, this transition may be implemented in stages by executing a switch-to-redundant-mode instruction (SW_RM) in each execution core. Staging the transition accommodates differences in the times at which the execution cores complete their data saving operations.

For the disclosed embodiment, SW_RM switches one execution core to a "ready state", e.g. CSB(b) 124=1, in a first stage. In the second stage, an SW_RM instruction switches the other execution core to a "ready state", e.g. CSB(a)=1. The processor returns to redundant mode when both execution cores reach the ready state, e.g. PSB=CSB(a) AND CSB(b). The first and second stages may overlap in whole (simultaneous switch), in part, or not at all (sequential switch), depending on the algorithm used to schedule the mode switch instructions.

The ready state allows the execution cores to be synchronized before the processor switches from split mode to redundant mode. For other embodiments of the invention, synchronization may be implemented through a hardware mechanism. For example, the first execution core may transition to a ready state when an end-of-routine condition is detected, and the second execution core may transition to the ready state when the first execution core completes its transition. As with software controlled mode switches, the ready state allows the execution cores to rendezvous before the processor is switched back to redundant mode.

Figure 4:
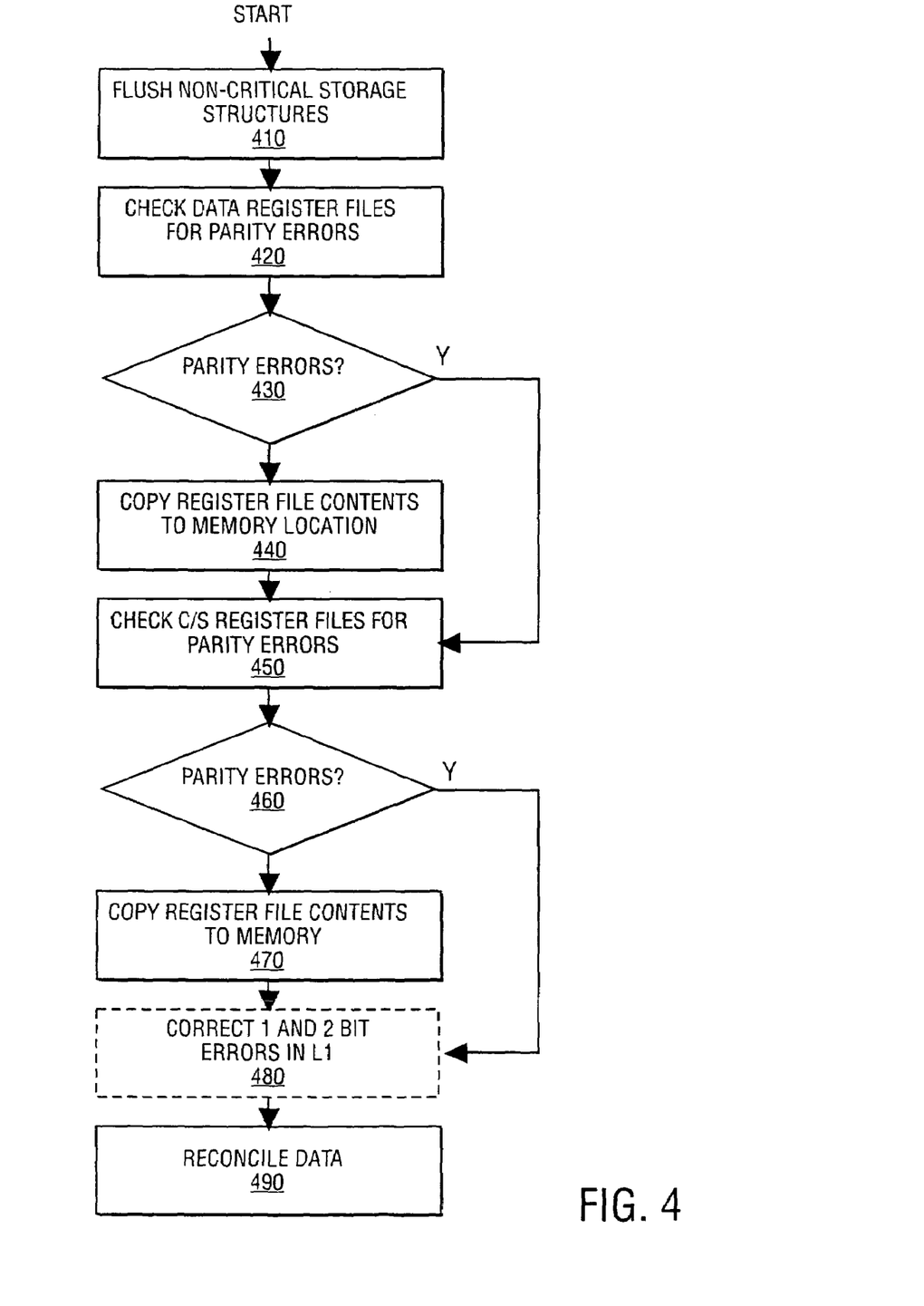
FIG. 4 is a flowchart representing one embodiment of an error recovery routine implemented by an execution core.

FIG. 4 illustrates one embodiment of a method 400 implemented by an execution core to save uncorrupted data. For example, method 400 may represent a portion of ERR implemented by an execution core following the switch to split mode. As noted above, ERR may be reached through a machine check, which transfers control of the processor to ERR through an associated vector table. ERR switches the processor from redundant to split mode, which allows each execution core to independently access and implement the data checking and recovery routine represented by FIG. 4.

According to the disclosed method, non-critical storage structures are flushed 410. Non-critical storage structures include, for example, caches, registers, and storage structures that do not store architectural state data. These storage structures typically are not parity-protected. Depending on the processor embodiment, these structures may include L0 instruction and data caches, branch target buffers, advanced load tracking tables and the like.

The contents of the data register files are checked 420 for parity errors. If no parity error is found 430, the contents of the data register files are copied 440 to a specified memory location. As noted above, this may be a memory location shared with the other execution core or it may be a memory location reserved for the particular execution core. If a parity error is found 430, no data is copied from the data register files. Alternatively, only uncorrupted data may be copied from the data register file(s).

The C/S register files are also checked 450 for parity errors. These include, for example, the core status register described above, various registers that store information about the current thread, and the translation registers in any translation look-aside buffers (TLB). If no parity error is found 460 in the C/S register files, the contents of the C/S register files are copied 470 to a specified memory location. If a parity error is found, no data is copied from the C/S register file(s). Alternatively, only uncorrupted data may be copied from the C/S register file(s).

Embodiments of the processor may implement error correction codes (ECC) for selected caches in firmware. This eliminates the need for ECC correction hardware in the processor, although the caches still store the ECC bits. For these embodiments, 1 and 2 bit errors may be corrected 480 through ERR. Block 480 is bypassed if ECC is implemented in hardware. Once all detected errors are corrected, the execution core jumps 490 to a wait state.

Once each execution core has executed method 400, the specified memory location contains only uncorrupted data. One consequence of the statistical nature of soft errors is that it is highly unlikely for the same data block to be corrupted in both execution cores at the same time. Consequently, the data saving process provides sufficient uncorrupted processor state data to initialize the execution cores and resume the interrupted program thread.

The present invention does not require the storage structures to be flushed or checked in any particular order. For example, data register files may be checked after C/S register files and non-critical files may be flushed at any convenient time in the process. The order indicated above is provided solely for purposes of illustration.

In addition to saving uncorrputed data to a designated memory location, ERR provides a mechanism to reconcile the saved data and provide each execution core with sufficient uncorrupted processor state data to resume the interrupted program thread.

Figure 5A:
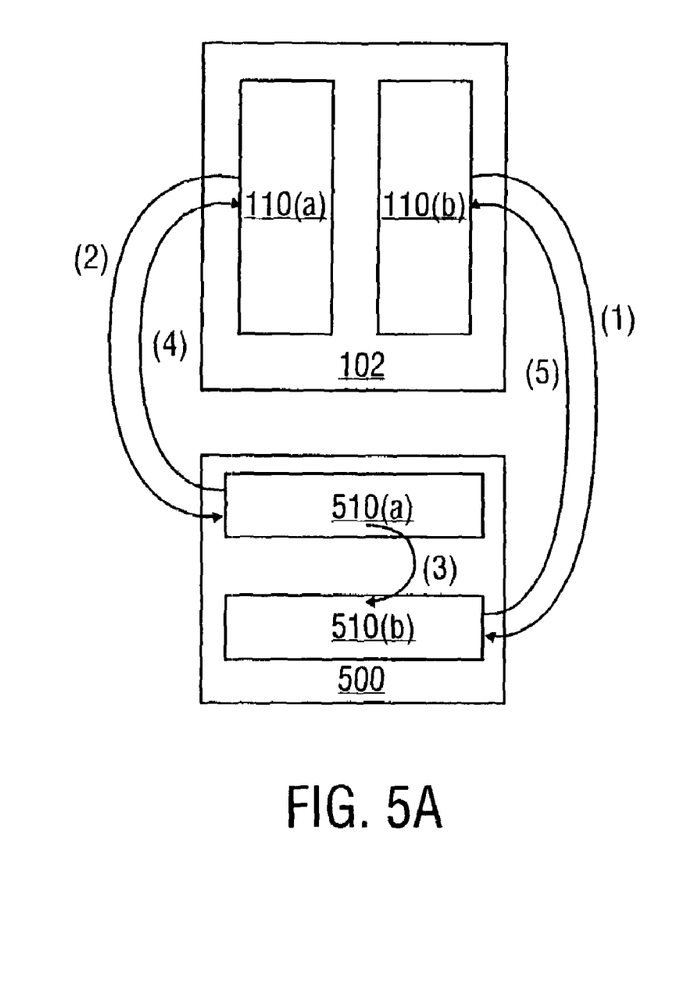
FIGS. 5A and 5B are block diagrams representing embodiments of different mechanisms for reconciling saved data for soft error recoveries.

FIG. 5A is a block diagram representing one mechanism for reconciling the data saved by each execution core in a dual execution core processor. Execution core 110(b) implements ERR to copy (1) its uncorrupted data to a designated location 510(b) in memory system 500. Execution core 110(a) implements ERR to copy (2) its uncorrupted data to a designated memory location 510(a). For the exemplary mechanism, a soft error in the storage structures of execution core 110(b) leaves location 510(b) with an incomplete set of processor state data. Execution core 110(a), which encounters no parity errors, copies (2) a complete set of processor state data to location 510(a). Here, "complete" refers to a subset of the processor state data that is sufficient to allow processor 102 to resume execution of the interrupted program thread. The corrupted data in the storage structures of execution core 110(b) may be tracked as execution core 110(b) copies (1) its uncorrupted data to memory location 510(b), to maintain a record of the data that needs to be updated.

Following data saving operations (1), (2), execution core 110(b) implements ERR to copy (3) uncorrupted data from location 510(a) to location 510(b). This provides a second complete set of processor state data for reinitializing the execution cores of processor 102. For example, when execution core 110(b) determines that execution core 110(a) has finished its copy operations, it may copy data from location 510(a) to location 510(b) for only those data blocks that correspond to corrupted data in its associated storage structures. This data reconciliation mechanism provides two sets of processor state data in memory 500, which may then be used to initialize (4) and (5) execution cores 110(a) and 110(b), respectively. Initializations (4) and (5) may be done separately by each execution core 110 in split mode or they may be done concurrently by the execution cores in redundant mode.

Except for the portion of ERR that copies (3) uncorrupted data from memory location 510(a) to memory location 510(b), the disclosed data reconciliation mechanism proceeds through redundant operations. Data is checked, saved to memory, and written back to storage structures by each execution core. This reduces the likelihood that a soft error generated in one set of processor state data during recovery will corrupt both execution cores.

Figure 6:
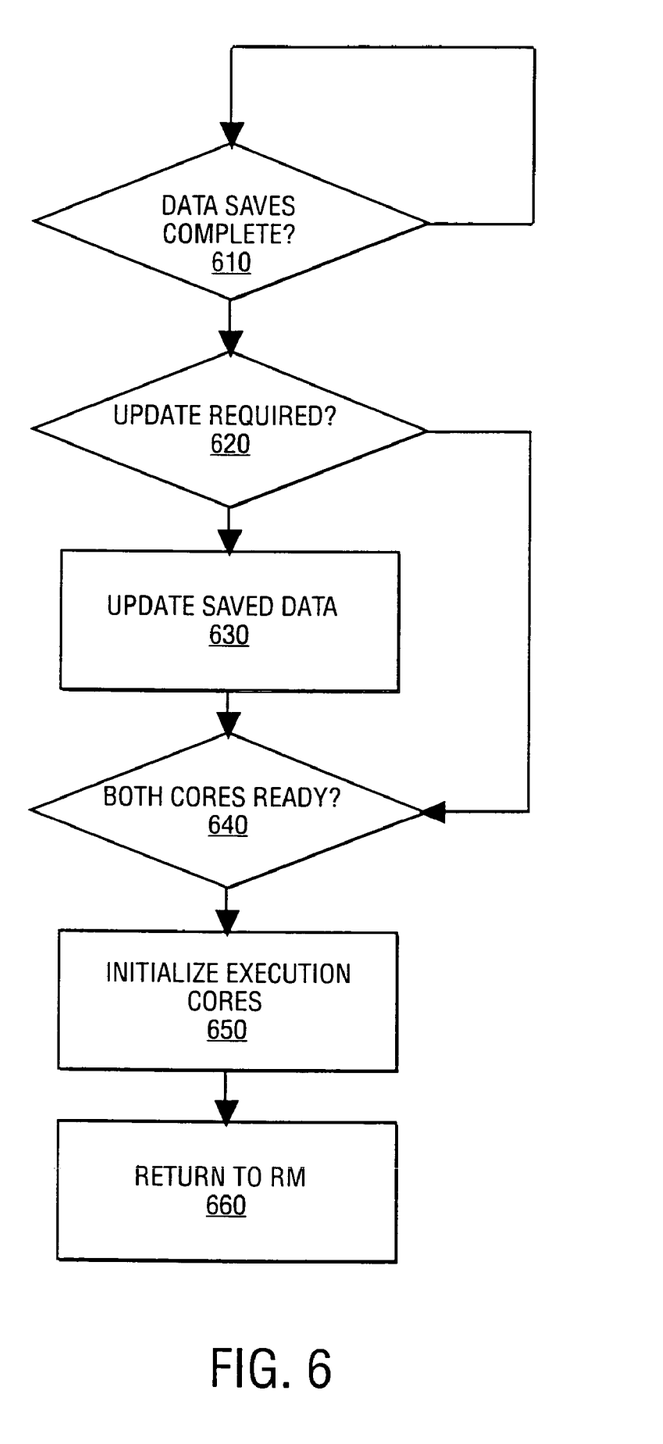
FIG. 6 is a flowchart representing one embodiment of the data reconciliation mechanism of FIG. 5A.

FIG. 6 is a flowchart representing the data reconciliation mechanism of FIG. 5A. This corresponds, for example, to block 490 of FIG. 4. A processor implementing the data reconciliation portion of ERR determines 610 whether the other execution core has completed its data save operations. When these operations complete, the execution core determines 620 whether it needs to update its saved data.

For one embodiment of method 600, the execution core that detected corrupted data in its storage structures updates 630 its saved data using corresponding data from the memory location of the other execution core. For example, the execution core may store an indication of the data blocks that appear corrupted during its save operations. This execution core may then use these indications to retrieve uncorrupted versions of the data from the appropriate memory address of the other execution core's designated memory location. The execution core that detected no corrupted data waits for the other execution core to complete 640 its update 630. When both execution cores reach wait state 640, the processor returns 650 to redundant mode and initializes 660 the execution cores with the reconciled data. An alternative embodiment of method 600 may initialize the execution cores in split mode and then return to redundant mode.

Figure 5B:
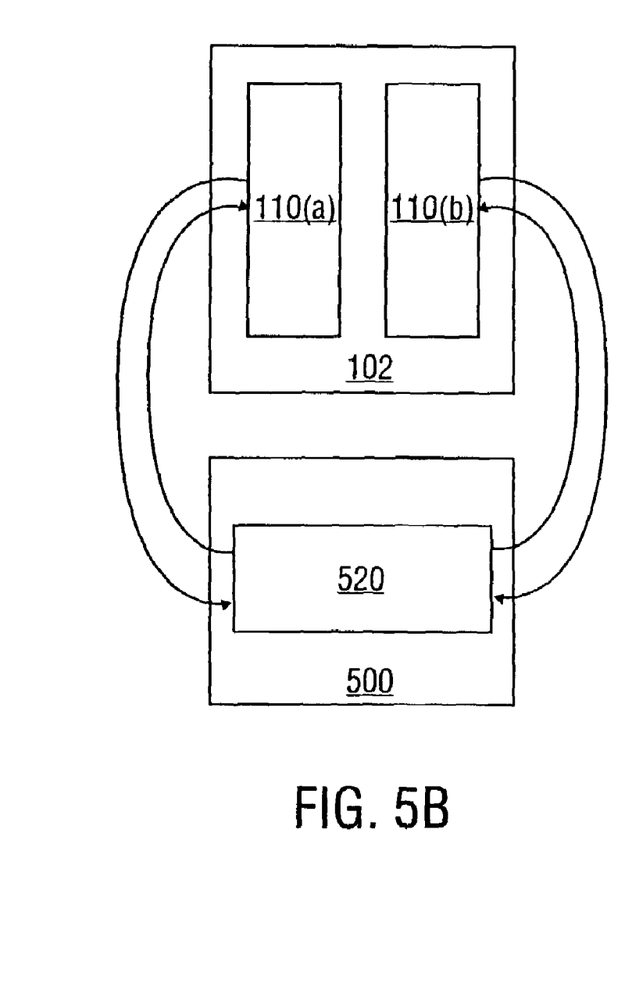

FIG. 5B represents an alternative mechanism for data reconciliation. For this mechanism, both execution cores 110(a) and 110(b) write (1) and (2), respectively, their uncorrupted data to corresponding memory addresses in the same memory location 520. For one embodiment of the mechanism, only the execution core having no corrupted data writes all its processor state data to memory location 520. The execution core that detects corrupted data in its storage structures does not copy the corrupted data to memory location 520.

Another embodiment of the mechanism in FIG. 5B may write data from the execution core that detects no uncorrupted data in its associated memory structures and skip the save step for the other execution core, i.e. the one that includes corrupted data. In either case, the processor state data copied to location 520 is complete and can be written back (3) and (4) to execution cores 110(a) and 110(b), respectively, to reinitialize them for resumption of the interrupted program thread. Since only one set of processor state data is maintained in the data reconciliation mechanism of FIG. 5B, a soft error in this data set during recovery is not detectable by a simple result comparison.

For the above described embodiments of the present invention, error recover is implemented with the processor in split mode to allow each execution core to identify independently any errors in its associated storage structures. It is also possible for soft error to arise during these error recovery operations, when redundant execution is not available to detect soft errors. For high reliability systems, even this limited vulnerability to soft errors may be too great.

For one embodiment of the invention, the execution resources of each execution core may be configured to operate in parallel as two or more logical clusters during split mode operation. While each execution core implements ERR independently, logically defined execution clusters within each execution core implement instructions from ERR redundantly. For this embodiment, instructions from ERR are replicated within each execution core and directed to different execution clusters. The results generated by the different execution clusters may be compared to determine whether a soft error arose as the ERR instructions were processed.

Figure 7:
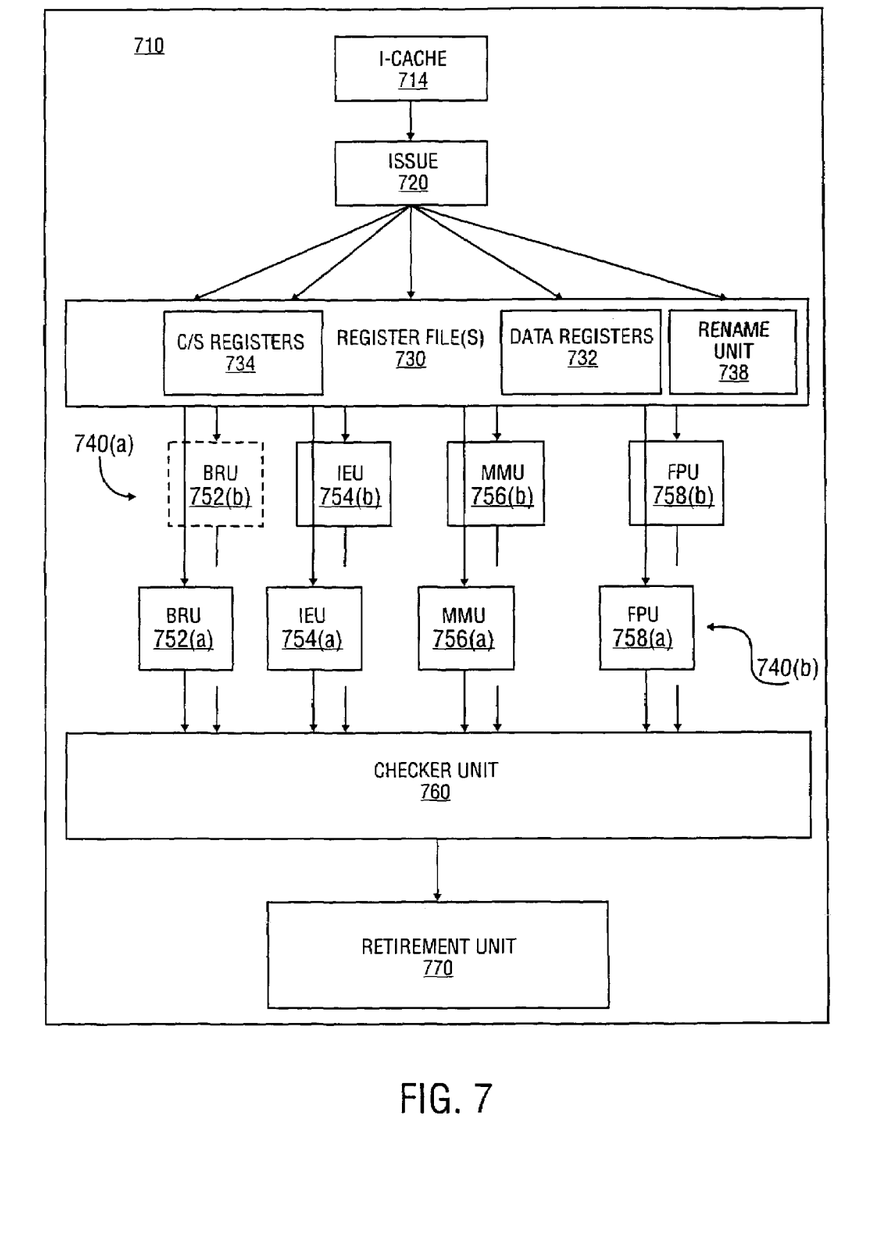
FIG. 7 is a block diagram of one embodiment of an execution core that provides cluster level redundancy when a dual core processor is operated in split mode.

FIG. 7 is a block diagram of one embodiment of an execution core 710 that includes this internal redundancy feature. The disclosed embodiment of execution core 710 includes an instruction cache (I-cache) 714, decode or dispersal unit 720, a register file(s) 730, first and second execution clusters 740(a) and 740(b), respectively, a check unit 760, and a retirement unit 770. In the following discussion, references to execution clusters 740(a) and 740(b) are not indexed unless necessary to avoid ambiguity. References to other resources in execution core 710 that may be duplicated, such as the execution units that make up execution clusters 740 are treated similarly.

For the disclosed embodiment, each execution cluster 740 includes a branch execution unit (BRU) 752, an integer execution unit (IEU) 754, a memory management (load/store) unit (MMU) 756, and a floating point unit (FPU) 758 (generically, "execution units"). Different embodiments of execution core 710 may include different types and numbers of execution units without departing from the scope of the present invention. For example, the Merced processor of Intel® Corporation employs a branch execution unit that include three separate branch execution units. Execution clusters 740 are shown separated to illustrate their logical organization in split mode, not to reflect any actual separation between the different execution resources.

Other embodiments of execution core 710 may not duplicate all execution units 750 or may not duplicate instructions to certain execution units. For example, branch execution units require significant processor resources for support, and considerable die area may be saved by not duplicating BRU 752. This is indicated by the dashed box around BRU 752(b) in FIG. 7. In this case, branch instructions may either not be executed redundantly, or alternate mechanisms may be employed to check their execution. For example, branch instructions may be duplicated and executed serially. Similarly, duplicating load and store instructions may saturate bandwidth to the memory system in HR mode. In this case, multiple MMUs 756 may be implemented to accommodate the presence of multiple load and/or store operations in an instruction bundle, but the individual load/store operations are not duplicated these instructions in HR mode. Similar arrangements may be employed for other execution units 750 and instruction types without departing from the spirit of the invention.

I-cache 714 provides instructions to decode unit 720, which directs them to appropriate execution units through register file(s) 730. Register files 730 include data register files 732, control/status (C/S) registers 734, and a register rename unit 738. Data register files 732 provide temporary storage for, e.g., the integer and floating point operands that are manipulated by execution units 750. Rename unit 738 maps the virtual register identifiers specified in μops to the physical registers in register file 730.

C/S registers 734 store information that controls the manner in which execution core 710 operates and the status of the various execution resources. For one embodiment of execution core 710, issue unit 720 provides identical instructions to execution clusters 740(*a*) and 740(*b*) when the processor is in split mode. For example, issue unit 720 provides the pops from an instruction (or the μops from identical instructions) to appropriate execution units in execution clusters 740(*a*) and 740(*b*). Results generated by clusters 740(*a*) and 740(*b*) are compared by check unit 760, and an error is indicated if the execution results are different. In redundant mode, execution clusters 740(*a*) and 740(*b*) may be controlled independently to process different instructions, and redundancy is provided by executing identical instructions on the other execution core. Execution core 710 provides execution cluster-level redundancy to protect processor from soft errors when it is operated in split mode. An embodiment of a processor that includes an execution core 710 is discussed in greater detail in U.S. patent application Ser. No. 09/470,098, entitled "Microprocessor With High Reliability Operating Mode" and filed on even date herewith.

There has thus been disclosed a firmware-based mechanism for correcting soft errors in a dual core processor that can be switched between redundant execution mode and split execution mode. When an error is detected in a program thread executing in redundant mode, the processor switches to split mode. In split mode, an execution core identifies uncorrupted processor state data in its storage structure and copies this uncorrupted data to a specified memory location. The uncorrupted data is reconciled to provide sufficient processor state data to resume execution of the interrupted program thread. The processor is returned to redundant execution mode, the execution cores are initialized with the processor state data, and the interrupted program thread is resumed. Switches between redundant mode and split mode may be implemented through mode switch instructions.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

I claim:

1. A computer system comprising:
a processor having first and second execution cores and a check unit, the first and second execution cores to process instructions independently when the processor is in a split mode and to process identical instructions in lock step when the processor is in a redundant mode, and the check unit to compare results from the first and second execution cores when the processor is in redundant mode, the first execution core comprising a first instruction cache and the second execution core comprising a second instruction cache and a selector to select instructions from the first instruction cache in the redundant mode and to select instructions from the second instruction cache in the split mode; and
a non-volatile memory in which is stored a recovery routine that switches the processor to split mode when the check unit detects an error, identifies uncorrupted processor state data from at least one of the execution cores, and initializes the first and second execution cores with the identified processor state data.

2. The computer system of claim 1, wherein the error recovery routine returns the processor to the redundant mode.

3. The computer system of claim 1, wherein the error recovery routine identifies uncorrupted processor state data in selected storage structures associated with each execution core, copies the uncorrupted processor state data to a specified memory location, and reconciles the copied processor state data, when the processor enters split mode.

4. A method comprising:
in response to a core status bit, determining whether a processor having a first and a second execution cores is in a redundant mode or a split mode;
using a selector within the second execution core to select a first instruction from a first instruction cache within the first execution core if the processor is in the redundant mode; and
using the selector within the second execution core to select a second instruction from a second instruction cache within the second execution core if the processor is in the split mode.

5. The method of claim 4, further comprising:
detecting a soft error when the processor is operating in the redundant mode;
executing an error recovery routine on each execution core to save uncorrupted data from storage structures associated with the first and second execution cores, wherein the error recovery routine is stored in a non-volatile memory; and
recovering processor state data from the saved uncorrupted data.

6. The method of claim 5, further comprising:
reconciling the saved, uncorrupted data to recover the processor state data; and
initializing the first and second execution cores using the recovered processor state data.

7. A machine readable medium on which are stored instructions that are executable by a processor having a first and a second execution cores to implement a method for recovering from soft errors, the method comprising:
in response to a core status bit, determining whether the processor is in the redundant mode or the split mode;
using a selector within the second execution core to select a first instruction from a first instruction cache within the first execution core if the processor is in the redundant mode;
using the selector within the second execution core to select a second instruction from a second instruction cache within the second execution core if the processor is in the split mode;
switching the processor to operate the first and second execution cores independently when a soft error is detected;
executing an error recovery routine on each of the first and second execution cores to recover a minimum set of processor state data from uncorrupted processor state data, wherein the error recovery routine is stored in a non-volatile memory; and
initializing each of the first and second execution cores, using the minimum set of processor state data.

8. The machine readable medium of claim 7, wherein initializing each of the dual execution cores comprises:
switching the processor to operate the dual execution cores in lock step; and
copying the minimum set of processor state data to each of the dual execution cores.

9. A processor comprising:

a first execution core operable in a split mode or a redundant mode, the first execution core comprising a first instruction cache; and a second execution core to process instructions independent of the first execution core in the split mode and to process instructions in lock step with the first execution core in the redundant mode, the second execution core comprising a second instruction cache and a selector to select instructions from the first instruction cache in the redundant mode and to select instructions from the second instruction cache in the split mode.

10. The processor of claim 9, further comprising:

a check unit to compare results from the first and second execution cores when the first and the second execution cores are in the redundant mode to detect errors.

11. The processor of claim 10, further comprising:

a first set of one or more storage structures associated with the first execution core to store processor state data of the first execution core; and a second set of one or more storage structures associated with the second execution core to store processor state data of the second execution core.

12. The processor of claim 11, wherein the first and the second sets of one or more storage structures are parity-protected.

13. The processor of claim 11, wherein, when the check unit detects an error, the first and the second execution cores switch to the split mode and save uncorrupted processor state data to an uncacheable portion of each of the first and second sets of one or more storage structures.

* * * * *